(12) United States Patent
Yamanashi (10) Patent No.: US 6,632,552 B2
(45) Date of Patent: Oct. 14, 2003

(54) WATER PURGE FUEL CELL SYSTEM AND METHOD

(75) Inventor: Fuminori Yamanashi, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 165 days.

(21) Appl. No.: 09/781,299

(22) Filed: Feb. 13, 2001

(65) Prior Publication Data

US 2001/0016276 A1 Aug. 23, 2001

(30) Foreign Application Priority Data

Feb. 18, 2000 (JP) .................................... P2000-041193

(51) Int. Cl.$^7$ .............................................. H01M 8/04
(52) U.S. Cl. .............................. 429/17; 429/12; 429/13; 429/22
(58) Field of Search .............................. 429/12, 13, 17, 429/22

(56) References Cited

U.S. PATENT DOCUMENTS 5,316,869 A * 5/1994 Perry, Jr. et al. ............... 429/19
6,051,331 A * 4/2000 Spear, Jr. et al. .............. 429/26

FOREIGN PATENT DOCUMENTS

JP          07-235324          9/1995

* cited by examiner

*Primary Examiner*—Carol Chaney
*Assistant Examiner*—Dah-Wei Yuan
(74) *Attorney, Agent, or Firm*—Foley & Lardner

(57) ABSTRACT

In a fuel cell system for use in a vehicle and a method controlling the system, the system includes a fuel cell, a first flow control valve controlling the flow rate of oxygen containing gas to be supplied to the fuel cell, and a second flow control valve controlling the flow rate of hydrogen containing gas to be supplied to the fuel cell. A control unit supplies purge fluid into the fuel cell to remove water in response to a load condition of the vehicle.

13 Claims, 10 Drawing Sheets

WATER PURGE FUEL CELL SYSTEM AND METHOD

BACKGROUND OF THE INVENTION

The present invention relates to a fuel cell system and method, and more particularly, to a fuel cell system and a method of controlling the same effective for removing water accumulated in an electrolytic membrane during operation of a fuel cell without reduction in an operating performance of the fuel cell.

In a fuel cell system, water usually accumulates in the vicinity of electrolytic membranes of a fuel cell stack during production of electric power, blocking fine pores of the electrolytic membranes and deteriorating operating performance of the fuel cell stack. To solve this situation, it has been proposed to cyclically purge the fuel cell with air or nitrogen gas for removing water from the fuel cell stack.

In Japanese Patent Application Laid-Open Publication No. H7-235324, it has been proposed to detect wet condition of electrodes, namely, electric resistance variation at the electrodes to purge the fuel cell stack with oxygen gas for thereby exhausting water outside.

SUMMARY OF THE INVENTION

Since, however, such a fuel cell is not operated so as to cover various operating conditions of a moving object powered by the fuel cell stack during purging operation of the fuel cell stack with suitable gas such as air in order to remove product water, there exists a situation in which electric power to be produced by the fuel cell stack is limited.

In the fuel cell powered moving object such as electric automotive vehicle, operating load varies in a wide range, and driving performance of the electric vehicle is deteriorated due to insufficient amount of electric power output produced by the fuel cell system. To solve this situation, it is required that an additional secondary battery is undesirably required to augment the insufficient electric power output, thereby lowering fuel consumption.

It is, therefore, an object of the present invention to provide a fuel cell system and a method of controlling the same for removing water from a fuel cell stack without deteriorating driving performance of the moving object and the operating performance of the fuel cell system.

In the present invention, a fuel cell system applied for a moving object, is provided with: a fuel cell; a first flow control valve controlling flow rate of oxygen containing gas to be supplied to the fuel cell; a second flow control valve controlling flow rate of hydrogen containing gas to be supplied to the fuel cell; and a control unit opening the first flow control valve and the second flow control valve to supply the oxygen containing gas and the hydrogen containing gas into the fuel cell as purge fluid to remove water from the fuel cell in response to load condition of a moving object.

In other word, a fuel cell system of the present invention is provided with a fuel cell; a first flow control means controlling flow rate of oxygen containing gas to be supplied to the fuel cell; a second flow control means controlling flow rate of hydrogen containing gas to be supplied to the fuel cell; and a purge means activating the first flow control means and the second flow control means to supply the oxygen containing gas and the hydrogen containing gas into the fuel cell as purge fluid to remove water from the fuel cell in response to load condition of a moving object.

Besides, a method of controlling a fuel cell system of the present invention is for a moving object powered by the fuel cell. The fuel cell system having a first flow control valve controlling flow rate of oxygen containing gas to be supplied to the fuel cell and a second flow control valve controlling flow rate of hydrogen containing gas to be supplied to the fuel cell. The method obtains load condition of a moving object and supplies the oxygen containing gas and the hydrogen containing gas into the fuel cell as purge fluid to remove water from the fuel cell in response to the load condition of the moving object in response to the load condition of the moving object.

Other aspect and advantages of the invention will become apparent from the following description, taken in conjunction with the accompanying drawings, illustrating by way of example the principles of the invention.

DETAILED DESCRIPTION OF THE PREFERRED EMBODIMENTS

A description of a fuel cell system and method in accordance with each of embodiments of the present invention will be in detail given below suitably with reference to the accompanying drawings by exemplifying a structure applied to a vehicle.

First, a fuel cell system and method of controlling the same according to the first embodiment of the present invention is described in detail with reference to FIGS. 1 to 3.

Figure 1:
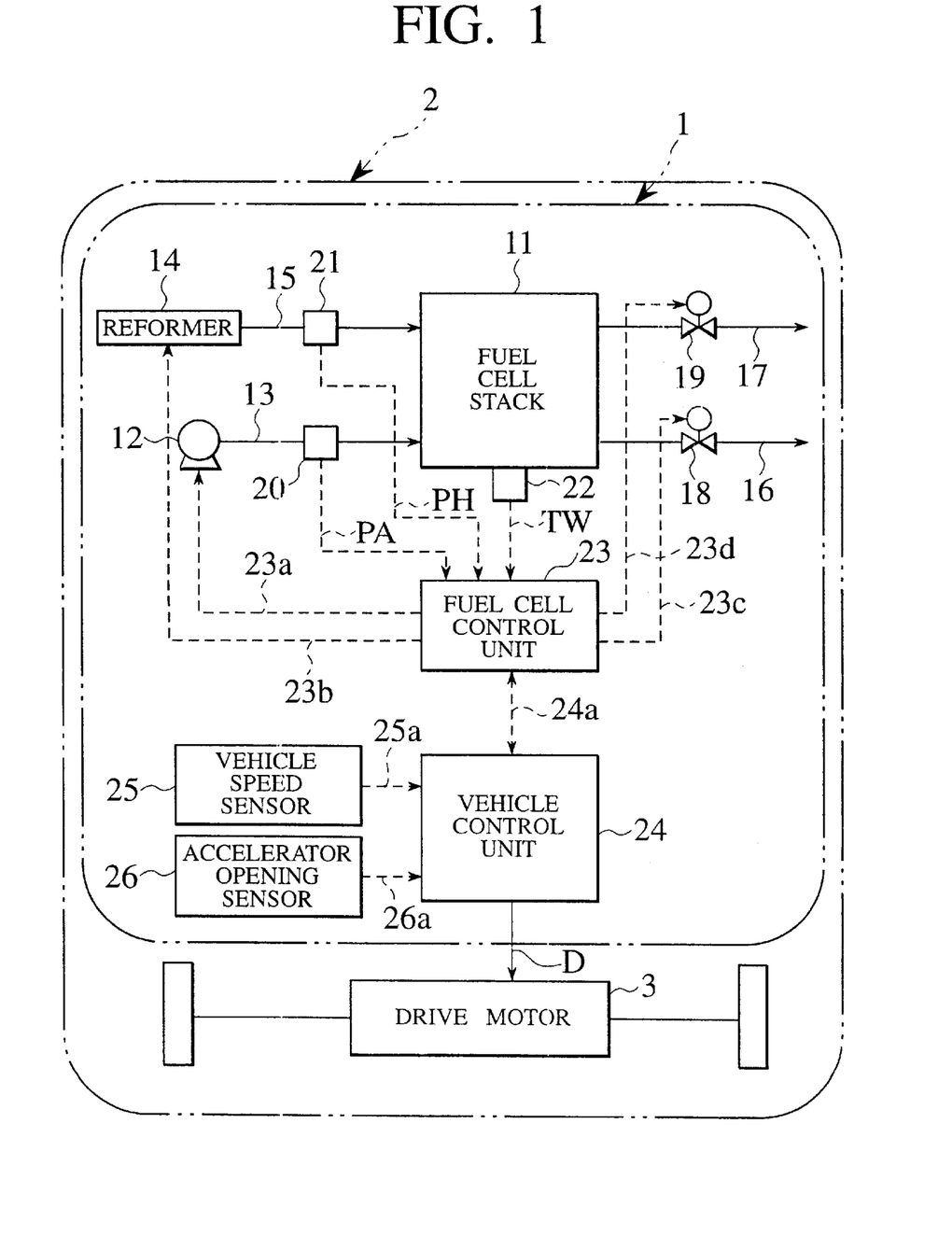
FIG. 1 is a block diagram illustrating a first embodiment of a fuel cell system according to the present invention.

FIG 1, is a block diagram illustrating the first embodiment of a fuel cell system according to the present invention for use in a moving object such as a vehicle 2. FIG. 2 shows a general flow diagram for illustrating the basic sequence of operations of the embodiment of the fuel cell system shown in FIG. 1, and FIG. 3 shows timing diagrams illustrating the operation of flow control valves of the embodiment of FIG. 1.

In this embodiment, the fuel cell system 1, which is installed in the vehicle 2, includes a fuel cell stack 11 having a plurality of sets of an electrolyte and opposing electrodes, namely, an anode and a cathode that are disposed on both sides of the electrolyte. An anode chamber of the fuel cell stack 11 is supplied with hydrogen containing gas that is delivered through a hydrogen gas supply pipe 15 from a reformer 14, and a cathode chamber of the fuel cell stack 11 is supplied with compressed air as oxygen containing gas that is delivered from a compressor 12 through an air supply pipe 13. Although, in the embodiment, the fuel cell system will be described as having the reformer 14 that reforms a feedstock such as methanol with steam for thereby producing fuel gas (hydrogen containing gas) containing a large amount of hydrogen, a supply source for the hydrogen containing gas is not limited to the reformer, but may be replaced with a hydrogen tank or a hydrogen occlusion alloy.

The fuel cell stack 11 has an air exhaust pipe 16 and a hydrogen gas exhaust pipe 17. The air exhaust pipe 16 has an air flow control valve 18 that corresponds to a first flow control valve according to the invention, and the hydrogen gas exhaust pipe 17 has a hydrogen gas flow control valve 19 that corresponds to a second control valve according to the present invention. The air flow control valve 18 and the hydrogen gas flow control valve 19 function to control respective valve openings for regulating air and hydrogen gas at respective flow rates to be supplied to the fuel cell stack 11 such that it produces electric power output demanded by operating conditions of moving objects such as vehicles. The air supply pipe 13 has an air pressure sensor 20 that detects the pressure of air to produce an air pressure detection signal PA, and the hydrogen gas supply pipe 15 has a hydrogen gas pressure sensor 21 that detects the pressure of hydrogen gas to produce a hydrogen gas pressure detection signal PH, such that air and hydrogen gas to be supplied to the fuel cell stack 11 are maintained at respective predetermined pressures in a manner as will be described below.

Further, the fuel cell system 1 also has a water temperature sensor 22 that detects the temperature of water coolant to be supplied to the fuel cell stack 11 to produce a water coolant temperature detection signal TW that is used for discriminating the warm-up operating condition of the fuel cell stack 11.

Also, the detection signals PA, PH, TW outputted by the air pressure sensor 20, the hydrogen gas pressure sensor 21 and the water coolant temperature sensor 22, respectively, are inputted to a fuel cell control unit 23. The fuel cell control unit 23 responds to these detection signals and produces command signals 23a, 23b, 23c, 23d that are applied to the compressor 12, the reformer 14, the air flow control valve 18 and the hydrogen gas flow control valve 19, respectively.

On the other hand, the fuel cell system 1 further includes a vehicle control unit 24, a vehicle speed sensor 25 that detects the vehicle speed and produces a vehicle speed detection signal 25a, and an accelerator opening sensor 26 that detects an accelerator pedal opening to produce an accelerator opening detection signal 26a. The vehicle control unit 24 responds to the vehicle speed detection signal 25a and the accelerator opening detection signal 26a, and produces a command value output signal 24a, which corresponds to a drive command value D applied to a drive motor 3, while controlling the drive motor 3.

Figure 2:
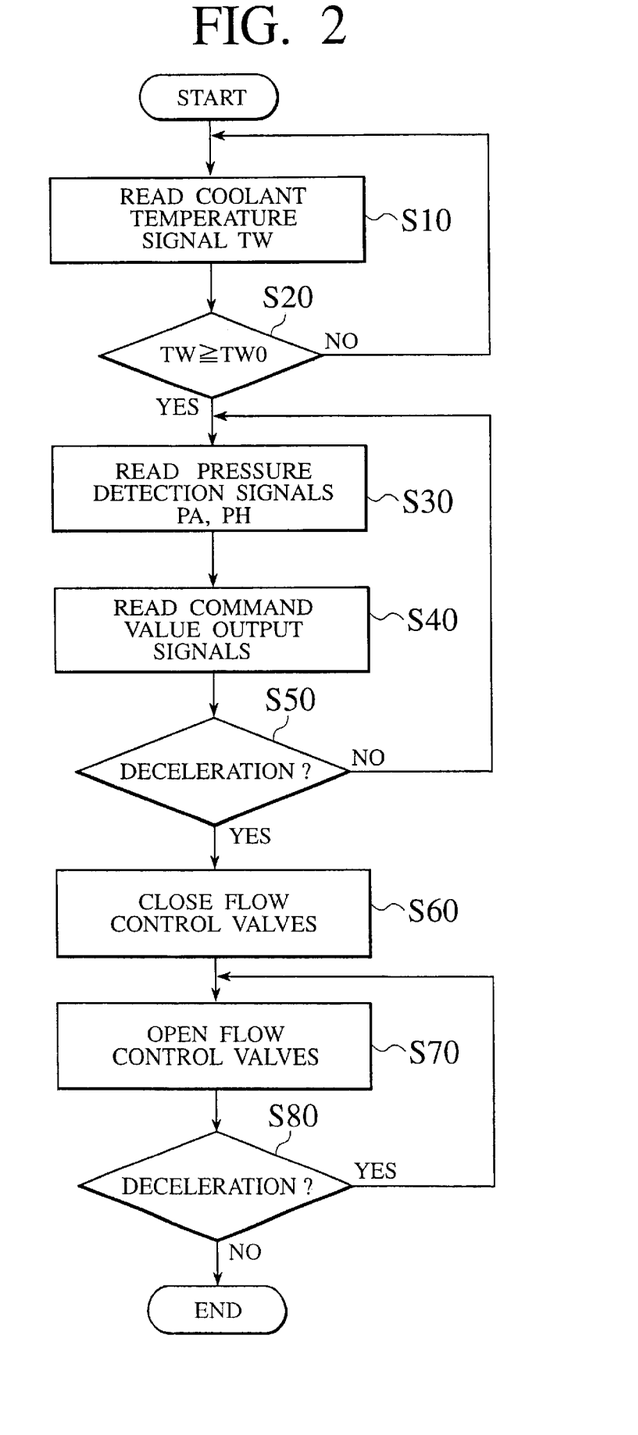
FIG. 2 is a general flow diagram for illustrating the basic sequence of operations of the fuel cell system according to the embodiment.

FIG. 2 is a general flow diagram for illustrating the basic sequence of operations which are repetitively executed by a microcomputer (not shown) of the fuel cell control unit 23 cooperating with the vehicle control unit 24 in accordance with a program, for controlling the first and second flow control valves 18, 19 such that the fuel cell system 11 is supplied with air and hydrogen gas at respective desired flow rates to meet the operating conditions of the vehicle. At the start, that is, when a starting key is turned on, the water coolant temperature is detected at step S10 to produce a water coolant register detection signal TW and the water coolant detection signal TW is read into a of the fuel cell control unit 23. In the execution steps S10 and S20, it is detected whether the warm-up temperature of the fuel cell stack 11 reaches the preset value or below the present value. That is, control of exhausting operation of the water coolant begins to be carried out when the warm-up temperature reaches the preset value. More specifically, in the execution step S20, the water coolant temperature signal TW representing current temperature detected by the water coolant temperature sensor 22 is compared with a reference preset temperature signal TWO representing that the warm-up operation of the fuel cell stack 11 is completed, and the operation waits until the water coolant temperature signal TW reaches the preset value TWO. Thus, it is detected whether the warm-up temperature of the fuel cell stack 11 reaches the preset value or below the present value. That is because of the fact that the control of exhausting operation for the water coolant begins to be carried out when the warm-up operation of the fuel cell stack 11 is completed.

In the next execution step S30, the air pressure detection signal PA and the hydrogen gas pressure signal PH are detected by the air pressure detection sensor 20 and the hydrogen gas pressure sensor 21, respectively, which pressure signals are read in a register of the fuel cell control unit 23. The fuel cell control unit 23 responds to these input signals and controls the rotational speed of the compressor 12, the reformer 14, the air flow control valve 18 and the hydrogen gas flow control valve 19 such that the pressures at the anode side and the cathode side of the fuel cell stack 11 and the pressure difference between the anode side and the cathode side do not exceed respective allowable limits to prevent an electrolytic membrane from being ruptured. This control is repeatedly carried out at successive sampling intervals.

In the steps S40 to S80, sequential operations are performed to meet a decelerating condition of the vehicle. More specifically, when the vehicle encounters deceleration during cruising, the drive command value D to be applied to the drive motor 3 from the vehicle control unit 24 becomes zero; that is, the vehicle is not driven. In the step S40, the command value output signal 24a corresponding to the drive command value D applied to the drive motor from the vehicle control unit 24 is read into a register of the fuel cell control unit 23. In the step S50, the command value output signal 24a is compared with preset data and, when the command value output signal 24a reaches the preset data, an output of step S50 represents that a load condition of the vehicle is detected as in a decelerating condition.

The decelerating condition of the vehicle may include not only a case wherein the vehicle encounters a negative acceleration but also a case wherein the vehicle is brought into a light load due to releasing of the accelerator pedal. Under these conditions, it is possible to purge the fuel cell stack 11.

In step S60, both the air flow control valve 18 and the hydrogen gas flow control valve 19 are closed for short time interval at each given cycle time such that the internal pressures of the fuel cell stack 11 increase. In the successive step S70, the air flow control valve 18 and the hydrogen gas flow control valve 19 are then held in their opened conditions until the decelerating condition of the vehicle is completed (step S80). In this event, however, it is required to monitor the pressure difference between the anode chamber and the cathode chamber such that the pressure difference does not exceeds a predetermined allowable value.

During each decelerating condition of the vehicle, product water remaining in the fuel cell stack 11 is efficiently exhausted through the air exhaust pipe 16 and the hydrogen gas exhaust pipe 17.

Incidentally, when the air flow control valve 18 and the hydrogen gas flow control valve 19 are closed at their respective completely closed positions in the step S60, the internal pressures of the fuel cell stack 11 are monitored by the air pressure sensor 20 and the hydrogen pressure sensor 21 and the flow control valves 18, 19 are instantaneously opened again before the pressure difference reaches the allowable limit.

Figure 3:
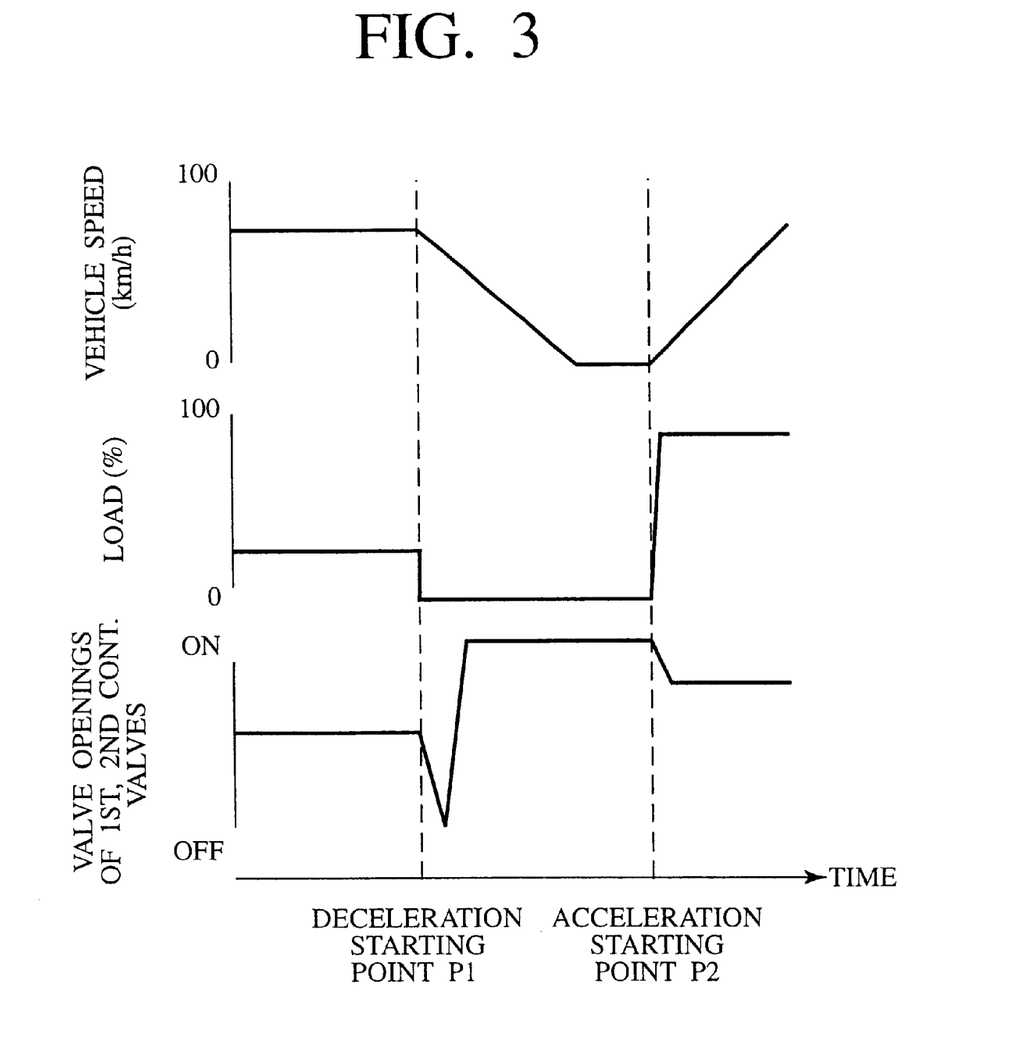
FIG. 3 shows timing diagrams illustrating the operation of flow control valves according to the embodiment.

FIG. 3 shows timing diagrams illustrating the relationships between changes in vehicle speed, vehicle load and the openings of the flow control valves 18, 19, and the operating condition of the vehicle powered by the fuel cell system 1 of FIG. 1. As shown by the timing diagrams of FIG. 3, when the vehicle is running from a deceleration starting point P1 to an acceleration starting point P2, the acceleration of the vehicle is minus or zero and, during this time interval, the vehicle load is zero. In this event, the flow control valves 18, 19 are closed at once at the decelerating starting point P1 and, thereafter, these control valves 18, 19 are instantaneously opened again. When the acceleration is started at the pint P2, the fuel cell control system 1 returns to its normal control mode.

Figure 4:
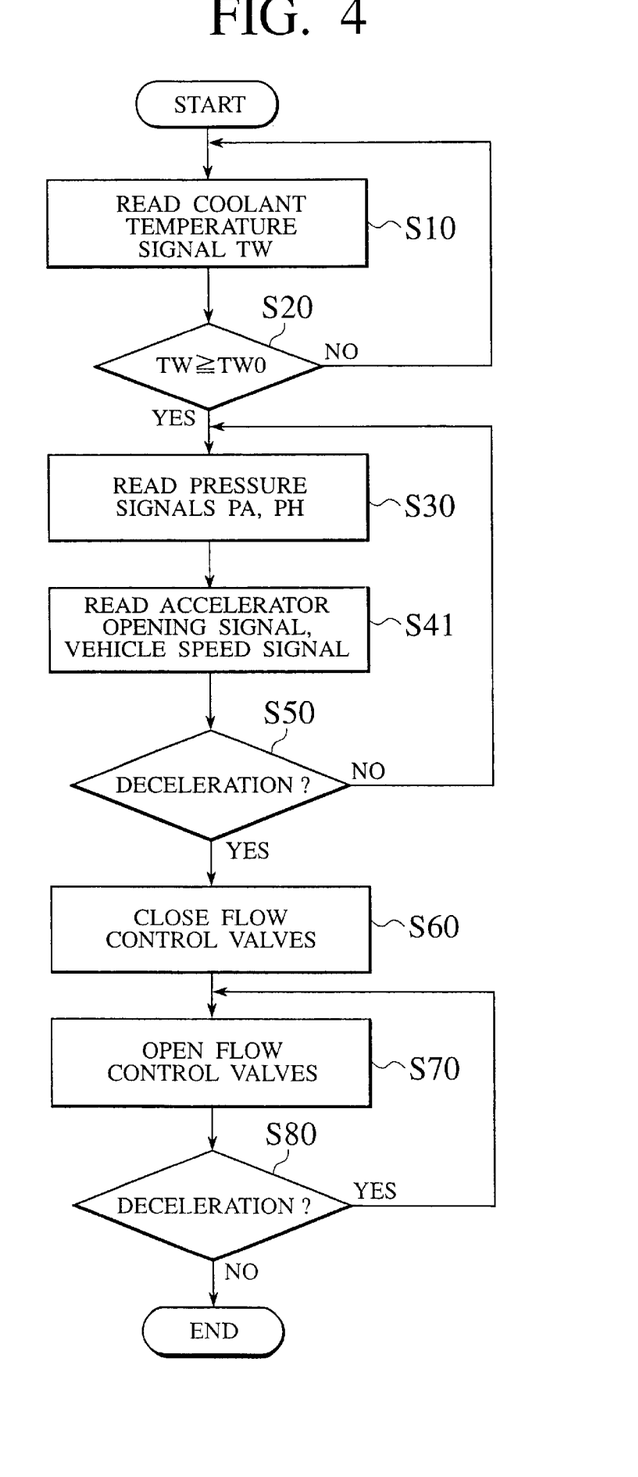
FIG. 4 is a general flow diagram for illustrating the basic sequence of operation of a second embodiment of a fuel cell system according to the present invention.

Next, a fuel cell system and method of the second embodiment of the present invention is described in detail also with reference to FIG. 4.

FIG. 4 shows a general flow diagram illustrating the basic sequence of operation of the second embodiment of a fuel cell system according to the present invention, provided that the fuel cell system has the same components as shown in FIG. 1. In the second embodiment of the fuel cell system of the present invention, the fuel cell system operates in the same basic sequence shown in FIG. 2 except the following sequence. That is, although the decelerating condition of the vehicle is detected by using the command value control signals to be applied to the fuel cell control unit 23 of the vehicle in the step S40 of FIG. 2, the deceleration of the vehicle is detected in the step S41 of FIG. 4 in the second embodiment by using the accelerator opening detection signal 26a and the vehicle speed detection signal 25a (see FIG. 1). It is to be noted here that the accelerator opening detection signal 26a may be corresponding to either one of a fully closed signal or a time change signal from opening sate to closing state of the accelerator pedal. That is, in order to detect the load condition of the vehicle, an accelerator opening degree is detected and when the accelerator opening degree corresponds to its fully closed state or the time change amount of the accelerator opening degree from the opening state to the closing state is equal to or larger than a predetermined value, a load condition of the vehicle is detected as in a decelerating condition. The vehicle speed detection signal 25a corresponding to the vehicle speed equal to or less than a predetermined value is additionally used to surely detect the decelerating condition. Preferably by use of such accelerator opening detection signal 26a and vehicle speed detection signal 25a, the deceleration condition of the vehicle is detected.

In accordance with the above embodiments, since the product water remaining in the fuel cell is exhausted during the deceleration condition of the moving object not requiring the electric power, the product water can be exhausted without deteriorating the driving performance of the moving object, and the deterioration of the operating performance of the fuel cell due to the blocking as to the fine pores of the electrolytic membranes can be effectively prevented.

The product water is removed from the fuel cell stack in a highly reliable fashion in response to the load detection signal of the moving object without deteriorating the operating performance of the fuel cell stack. The first and second flow control valves are utilized, and the fuel cell control unit opens the first and second flow control valves such that the oxygen containing gas and the hydrogen containing gas are supplied into the fuel cell stack as purge gas to remove water from the fuel cell stack. The obvious result is the elimination of costly new first and second flow control valves and associated components.

The oxygen containing gas and the hydrogen containing gas are supplied into the fuel cell stack during decelerating condition of the moving object. Consequently, the fuel cell stack is not supplied with purge gas during a normal operating condition of the moving object wherein maximum power output is required during accelerating condition of the moving object.

The moving object such as vehicles are subjected to frequent acceleration or deceleration during cruising, and a large amount of water is formed in the fuel cell stack especially when the moving object is running under high load, namely, during the acceleration. After the acceleration of the moving object, the moving object surely goes into the decelerating condition. During deceleration of the moving object, electric power required for propelling the moving object is at a minimum level and, accordingly, the fuel cell stack is supplied with purge gas to remove water during the deceleration of the moving object.

The decelerating condition of the moving object is discriminated by detecting the vehicle load, and the first and the second flow control valves are opened to supply the oxygen containing gas and the hydrogen containing gas into the fuel cell stack as purge gas to remove water from the fuel cell stack without deteriorating the operating performance of the fuel cell system.

And also, the control unit is arranged to momentarily close the first and second flow control valves for increasing internal pressure of the fuel cell stack and subsequently open the first and second flow control valves. Accordingly, a purging performance of water is highly improved.

And still also, the control unit functions to supply purge fluid into the fuel cell stack at predetermined purge cycle times and, therefore, purge control is extremely easy with a resultant low cost.

Figure 5:
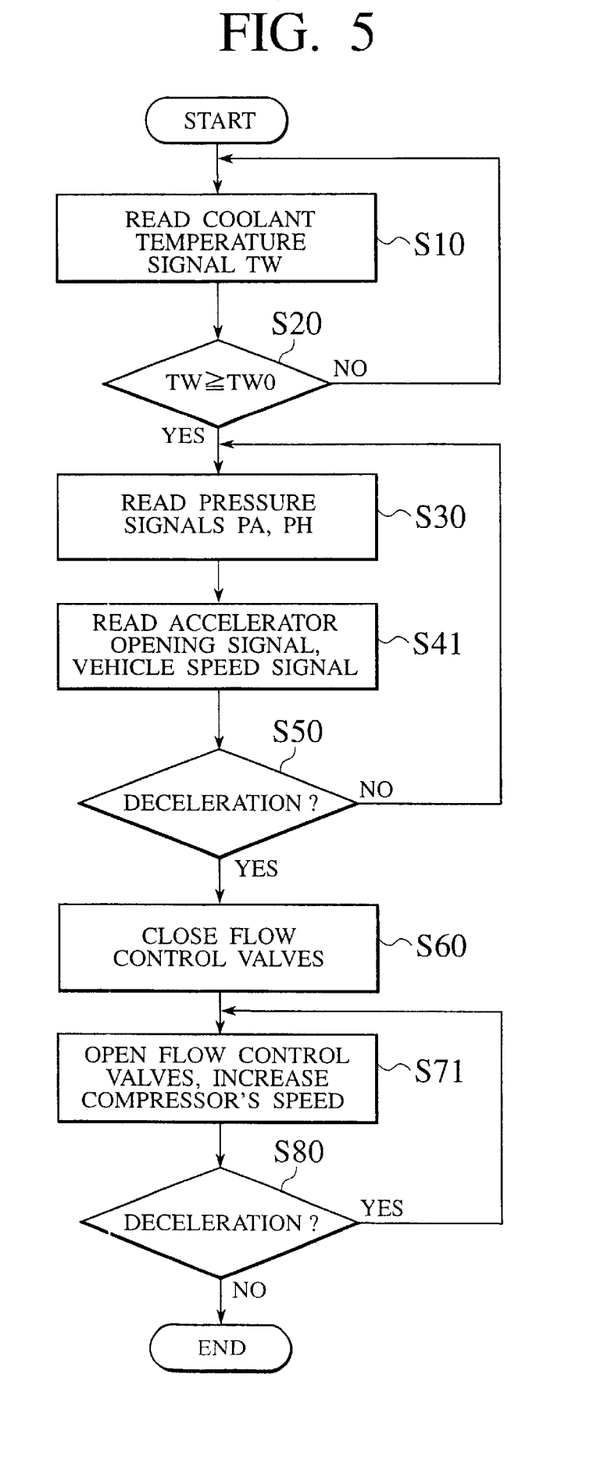
FIG. 5 is a general flow diagram for illustrating the basic sequence of operation of a third embodiment of a fuel cell system according to the present invention.

Next, a fuel cell system and method of the third embodiment of the present invention is described in detail also with reference to FIG. 5.

FIG. 5 shows a general flow diagram illustrating basic sequence of operation of the third embodiment of a fuel cell system according to the present invention, provided that the fuel cell control system has the same components as shown in FIG. 1. In the third embodiment of the fuel cell system of the present invention, the fuel cell system operates in the same basic sequence of the second embodiment shown in FIG. 4 except the following sequence. That is, the step S70 in FIG. 4 is replaced with step S71 in FIG. 5, and in the step S71 shown in FIG. 5, when the flow control valves 18, 19 are fully opened, the compressor 12 is driven at an increased speed. By this increase in the rotational speed of the compressor 12, water in the fuel cell stack 11 can be removed at an increased flow rate.

In accordance with the present embodiment, the fuel cell system utilizes a compressor that supplies the oxygen containing air under pressure into the fuel cell stack, and the control unit functions to momentarily increase the rotational speed of the compressor during purging water from the fuel cell stack. Thus, the fuel cell stack is supplied under increased pressure into the fuel cell stack such that the purging efficiency is increased.

Incidentally, in the embodiment, although the basic sequence of the second embodiment shown in FIG. 4 is used, it is needless to say that the basic sequence of the first embodiment shown in FIG. 2 can be used.

Figure 6:
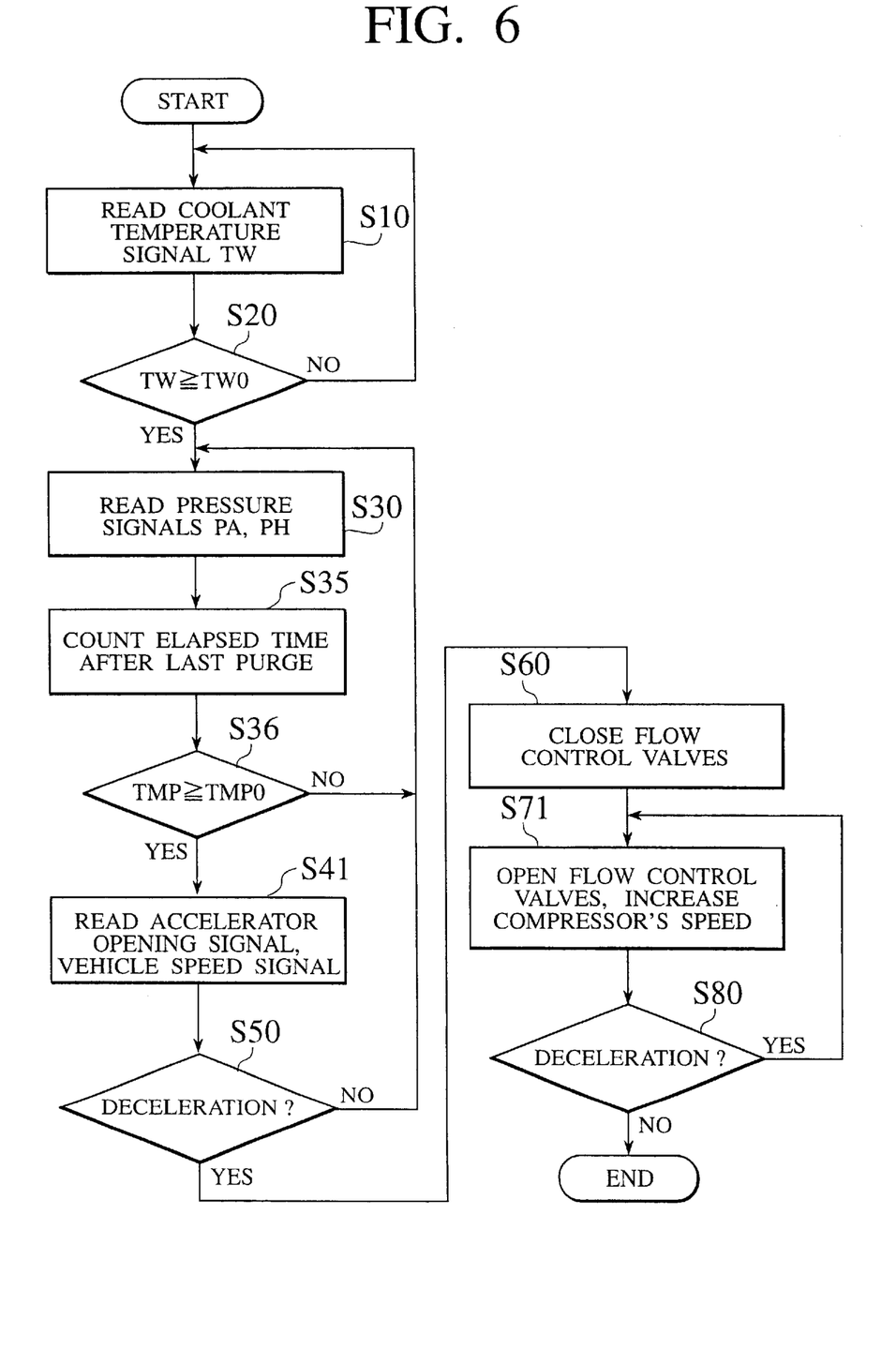
FIG. 6 is a general flow diagram for illustrating the basic sequence of operation of a fourth embodiment of a fuel cell system according to the present invention.

Next, a fuel cell system and method of the fourth embodiment of the present invention is described in detail also with reference to FIG. 6.

FIG. 6 shows a general flow diagram illustrating basic sequence of operation of the fourth embodiment of a fuel cell system according to the present invention, provided that the fuel cell system has the same components as shown in FIG. 1. In the embodiment of the fuel cell system of the present invention, the fuel cell system operates in the same basic sequence of the third embodiment shown in FIG. 5 except that steps S35 and 36 are added. That is, the fuel cell stack 11 is repeatedly supplied with a purge gas at predetermined purge cycle times, and an elapsed time TMP between the fore and aft supplies of the purge gas is counted and stored in a register in the step S35 of FIG. 6. In the step S36, the elapsed time TMP is compared with a reference time data TMPO. When, in this event, the elapsed time TMP does not reach the value of TMPO, the sequence is returned to the step S30 and the purging operation is not carried out.

In accordance with the present embodiment, so-called purge history is referred to. That is, when the elapsed time does not exceeds a predetermined value, it is assumed that the product water does not remain in the fuel cell stack 11 and, in this event, a correcting sequence is added to prevent the purging operation in the fuel cell stack 11.

Incidentally, in the embodiment, although the basic sequence of the third embodiment shown in FIG. 5 is used, it is needless to say that the basic sequence of the first embodiment shown in FIG. 2 or the second embodiment shown in FIG. 4 can be used.

Figure 7:
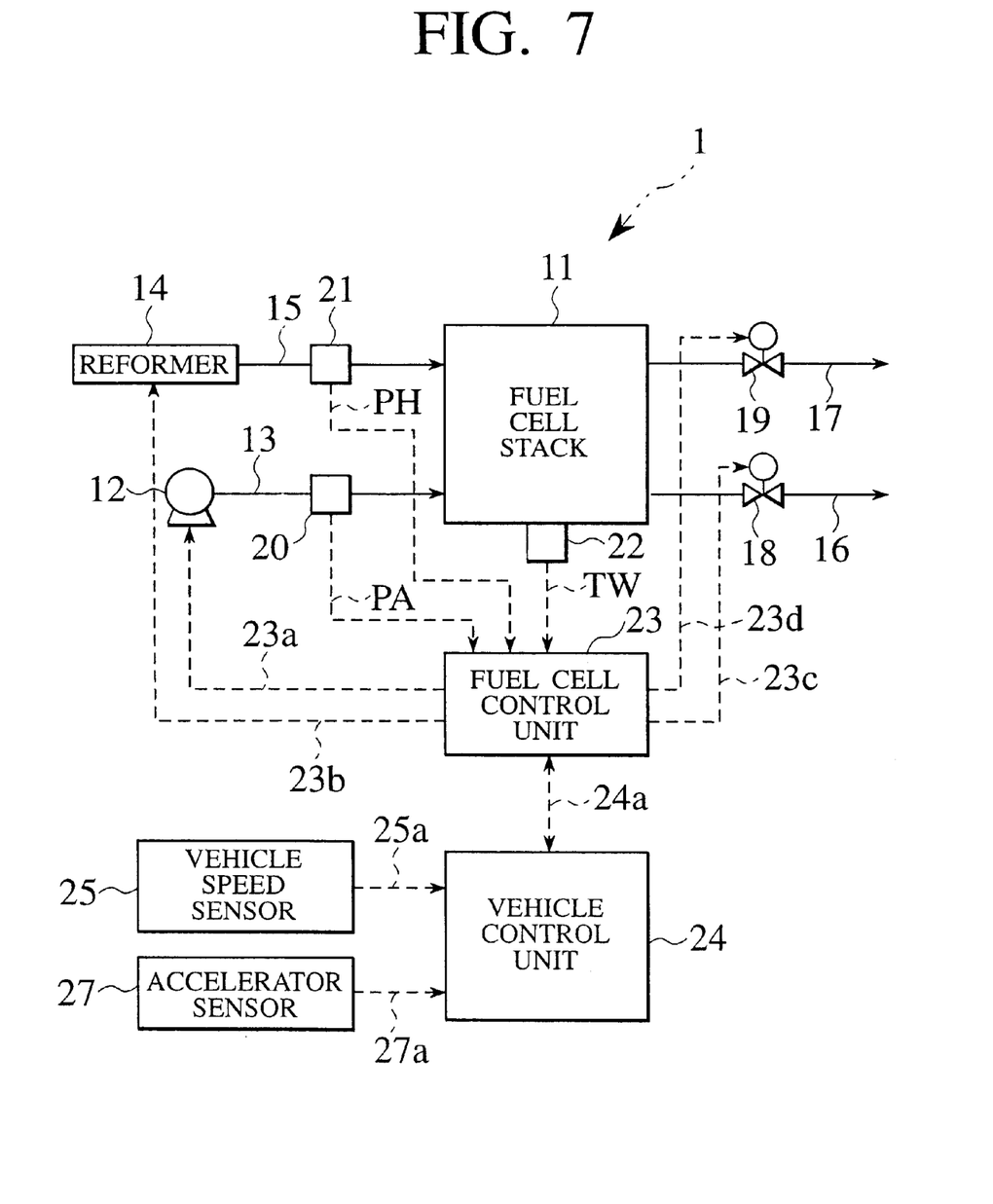
FIG. 7 is a block diagram of a fifth embodiment of a fuel cell system according to the present invention.
Figure 8:
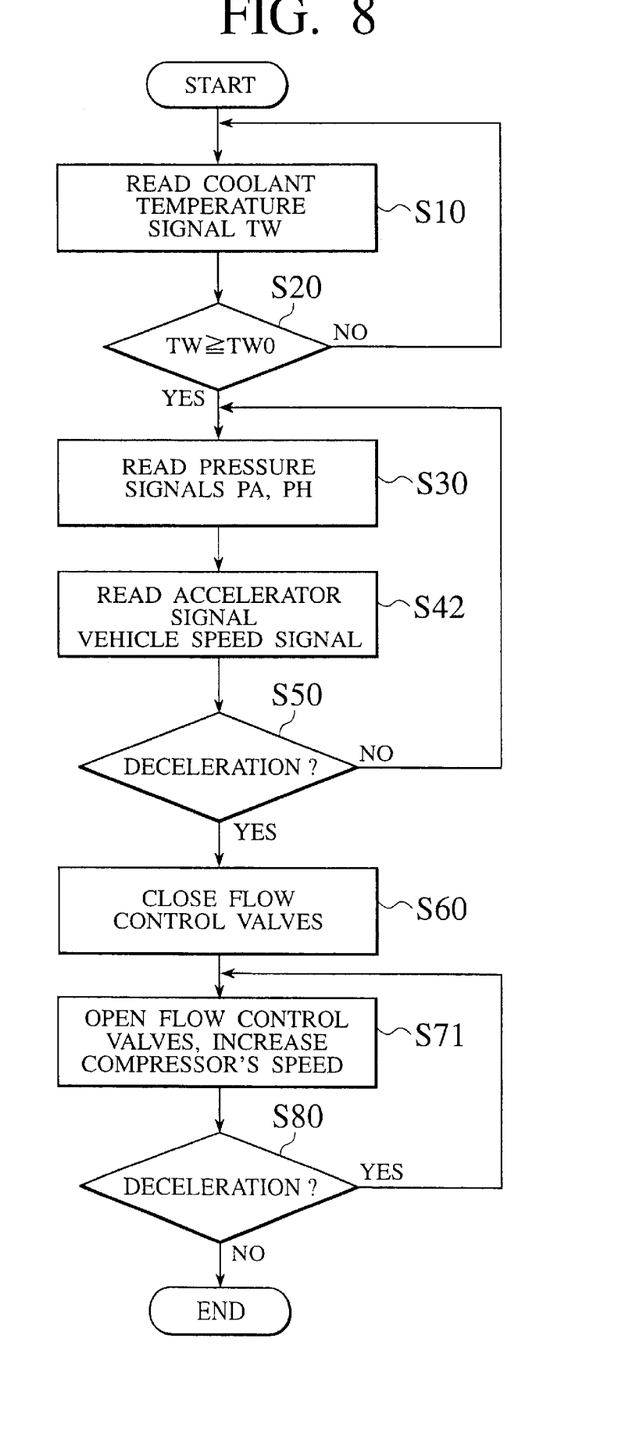
FIG. 8 is a general flow diagram for illustrating the basic sequence of operation of the fuel cell system according to the embodiment.

Next, a fuel cell system and method of the fifth embodiment of the present invention is described in detail also with reference to FIGS. 7 and 8.

FIG. 7 shows a block diagram of the fifth embodiment of a fuel cell system according to the present invention and FIG. 8 shows a flow diagram illustrating operating sequence thereof. The structure of the fifth embodiment shown in FIG. 7 is basically identical with the first embodiment of FIG. 1 except that the accelerator opening sensor is replaced with an acceleration sensor 27 that is originally used for ABS (an anti-lock braking system) and produces an acceleration detection signal 27a. In the embodiment of the fuel cell system of the present invention, the fuel cell system operates in the same basic sequence of the third embodiment shown in FIG. 5 except that step S42 is applied, that is, the step S41 in FIG. 5 is replaced with the step S42 in FIG. 8.

In step S42 of the general flow diagram shown in FIG. 8, the vehicle speed detection signal 25a and the acceleration detection signal 27a are stored in a register and, in step S50, a decelerating condition is detected by comparing the vehicle speed detection signal and the acceleration detection signal with respective data.

In accordance with the present embodiment, the fuel cell system includes the vehicle control unit responsive to the acceleration detection signal delivered from the acceleration sensor. The vehicle control unit discriminates that the moving object is in the decelerating condition when the acceleration has a negative value.

Incidentally, in the embodiment, although the basic sequence of the third embodiment shown in FIG. 5 is used, it is needless to say that the basic sequence of the first embodiment shown in FIG. 2, the second embodiment shown in FIG. 4 or the fourth embodiment shown in FIG. 6 can be used.

And also, in the above-mentioned embodiments, the fuel cell system utilizes the drive command value to be applied to the drive motor of the moving object, the accelerator opening degree, and the acceleration of the moving object, and then all of the sensors to detect these parameters are basically already used as necessary components in the moving object. Thus, it is possible to purge water from the fuel cell without newly adding any particular sensors in the moving object.

Figure 9:
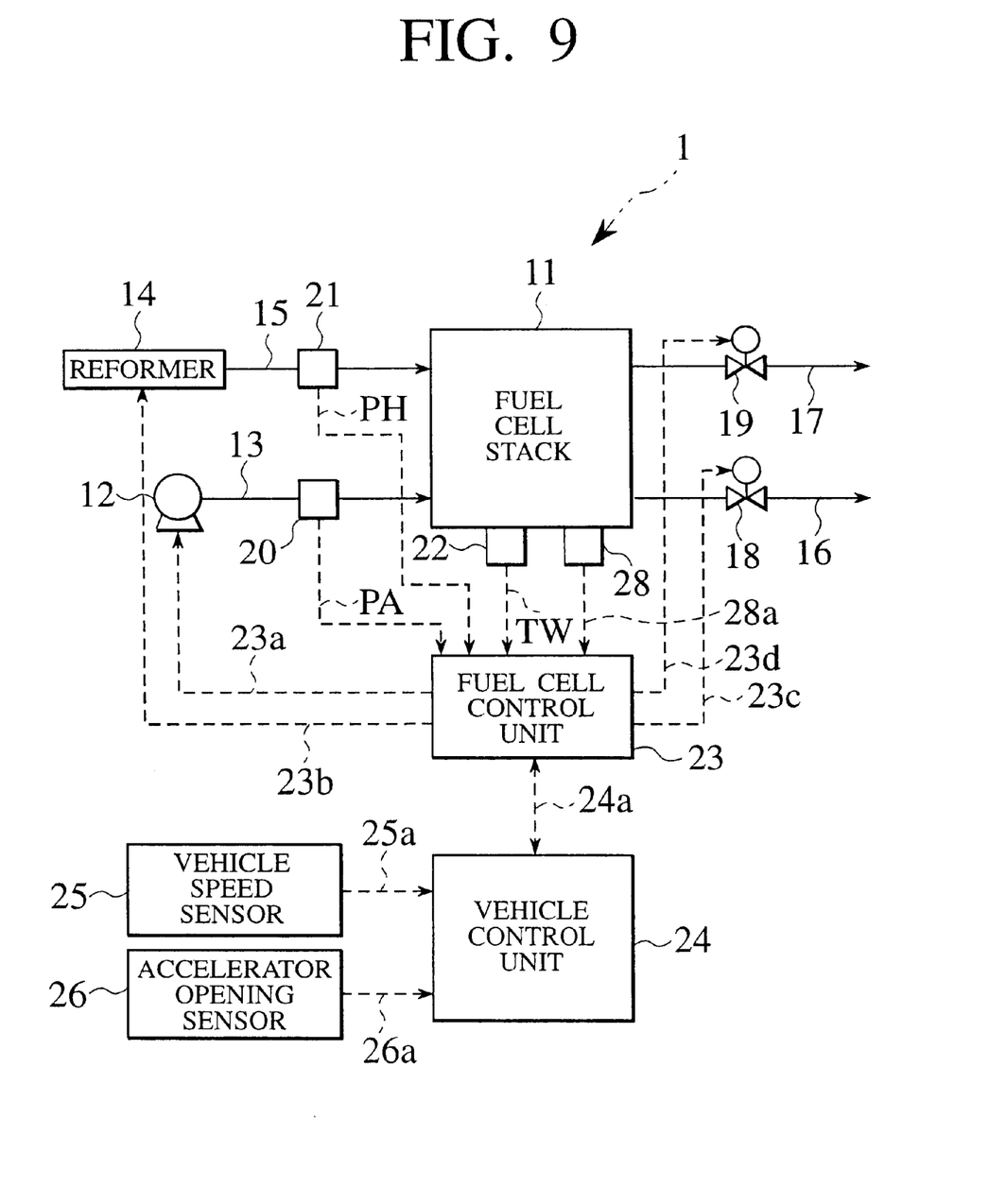
FIG. 9 is a block diagram of a sixth embodiment of a fuel cell system according to the present invention.
Figure 10:
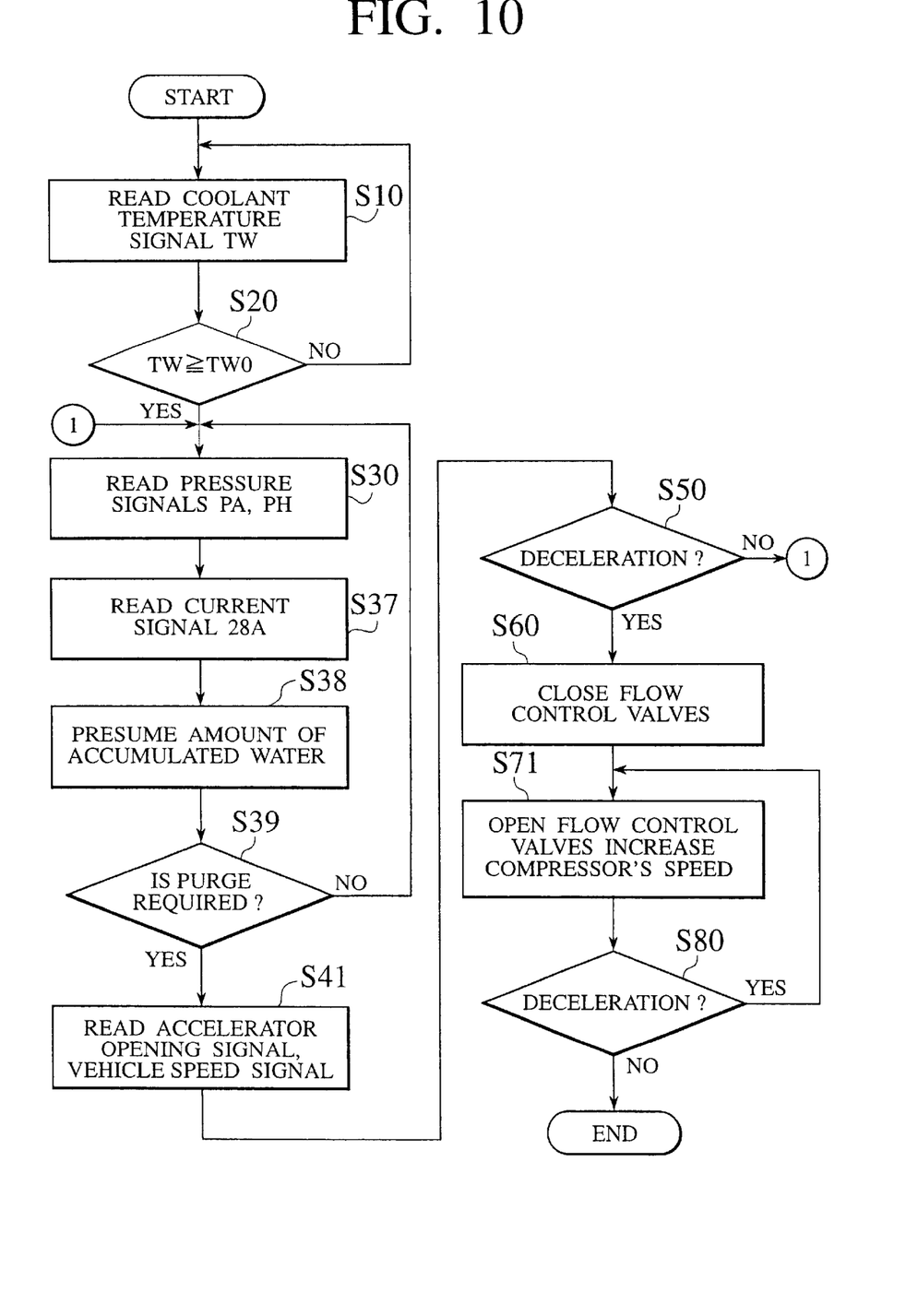
FIG. 10 is a general flow diagram for illustrating the basis sequence of operation of the fuel cell system according to the embodiment.

Next, a fuel cell system and method of the sixth embodiment of the present invention is described in detail also with reference to FIGS. 9 and 10.

FIG. 9 shows a block diagram illustrating the sixth embodiment of a fuel cell system according to the present Aft invention, and FIG. 10 shows a general flow diagram illustrating basic sequence of operation thereof. The fuel cell system 1 of the sixths embodiment of FIGS. 9 and 10 is identical in structure with that of FIG. 1 except that an electric current sensor 28 is coupled to the fuel cell stack 11 to produce an electric current signal 28a. The electric current sensor 28 is utilized for presuming an amount of water accumulated in the fuel cell stack 11, and the amount of water is calculated and presumed on the basis of the total amount of electric current flowing in the fuel cell stack 11.

In the embodiment of the fuel cell system of the present invention, the fuel cell system operates in the same basic sequence of the third embodiment shown in FIG. 5 except that steps S37 to 39 are added. That is, as shown in a general flow diagram illustrating basic sequence of operation in FIG. 10, an electric current detection signal is stored in a register in step S37. In step S38, an amount of water accumulated in the fuel cell stack 11 is presumed to provide a presumed output representing the amount of water accumulated in the fuel cell stack 11. In succeeding step S39, the presumed output is discriminated to judge whether the gas purging is required.

In accordance with the present embodiment, the electric current sensor is provided so as to detect the electric current, and wherein the fuel cell control unit responds to the electric current, that is, so-called electric power generation history and produces the output signal representing the presumed amount of the water accumulated in the fuel cell. The fuel cell control unit is responsive to the output signal for opening the first and second flow control valves to supply the oxygen containing gas and the hydrogen containing gas as purge fluid into the fuel cell to remove the water.

Incidentally, in the present embodiment, the electric current sensor 28 may be replaced with an electric power output sensor.

And also, although the basic sequence of the third embodiment shown in FIG. 5 is used, it is needless to say that the basic sequence of the first embodiment shown in FIG. 2, the second embodiment shown in FIG. 4, the fourth embodiment shown in FIG. 6 or the fifth embodiment shown in FIGS. 7 and 8 can be used.

The entire content of a Patent Application No. TOKUGAN 2000-41193 with a filing date of Feb. 18, 2000 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system applied for a moving object, comprising:
    a fuel cell;
    a first flow control valve controlling flow rate of oxygen containing gas to be supplied to the fuel cell;
    a second flow control valve controlling flow rate of hydrogen containing gas to be supplied to the fuel cell; and a control unit opening the first flow control valve and the second flow control valve to increase supply of the oxygen containing gas and the hydrogen containing gas into the fuel cell as purge fluid in response to a decelerating condition of a moving object, the purge fluid removing water from the fuel cell.

2. A fuel cell system according to claim 1, wherein the control unit momentarily closes the first flow control valve and the second flow control valve to increase an internal pressure of the fuel cell prior to opening the first flow control valve and the second flow control valve in response to the decelerating condition of the moving object.

3. A fuel cell system according to claim 1, wherein a compressor supplying the oxygen containing gas under pressure into the fuel cell is provided, and wherein the control unit momentarily increases the rotational speed of the compressor to increase an internal pressure of the fuel cell when the first flow control valve and the second flow control valve are opened to supply the oxygen containing gas and the hydrogen containing gas into the fuel cell at increased flow rates as purge fluid in response to the decelerating condition of the moving object.

4. A fuel cell system according to claim 1, wherein the moving object is provided with a drive motor powered by the fuel cell, and the control unit has a fuel cell control unit and a vehicle control unit producing a command value output signal that is applied to the fuel cell control unit and corresponds to a drive command value applied to the drive motor, and wherein the fuel cell control unit opens the first flow control valve and the second flow control valve to supply the oxygen containing gas and the hydrogen containing gas into the fuel cell as purge fluid to remove water from the fuel cell in response to the command value output signal.

5. A fuel cell system according to claim 4, wherein the fuel cell control unit opens the first flow control valve and the second flow control valve to supply the oxygen containing gas and the hydrogen containing gas into the fuel cell as purge fluid to remove water from the fuel cell when the drive command value has a zero level.

6. A fuel cell system according to claim 1, wherein an accelerator opening sensor is provided for producing an accelerator opening detection signal representing an opening degree of an accelerator of the moving object, and wherein the control unit opens the first flow control valve and the second flow control valve to supply the oxygen containing gas and the hydrogen containing gas as purge fluid into the fuel cell to remove water from the fuel cell in response to the accelerator opening detection signal when the accelerator opening degree corresponds to a fully closed state or a time change amount of the accelerator opening degree from an opening state to a closing state is equal to or larger than a predetermined value.

7. A fuel cell system according to claim 1, wherein an acceleration sensor is provided for producing a deceleration detection signal representing acceleration of the moving object, and wherein the control unit opens the first flow control valve and the second flow control valve to supply the oxygen containing gas and the hydrogen containing gas as purge fluid into the fuel cell to remove water from the fuel cell in response to the deceleration detection signal when the deceleration detection signal has a negative value.

8. A fuel cell system according to claim 1, wherein the control unit opens the first flow control valve and the second flow control valve to supply the oxygen containing gas and the hydrogen containing gas as purge fluid into the fuel cell to remove water based on a purge history.

9. A fuel cell system according to claim 8, wherein the control unit opens the first flow control valve and the second flow control valve to supply the oxygen containing gas and the hydrogen containing gas as purge fluid into the fuel cell to remove water at a purge cycle time.

10. A fuel cell system according to claim 1, wherein the control unit presumes an amount of water accumulated in the fuel cell based on an electric power generation history, and opens the first flow control valve and the second flow control valve to supply the oxygen containing gas and the hydrogen containing gas as purge fluid into the fuel cell to remove water based on the presumed amount of water.

11. A fuel cell system according to claim 10, wherein an electric current sensor detecting electric current and producing an electric current detection signal is provided, and wherein the control unit opens the first flow control valve and the second flow control valve to supply the oxygen containing gas and the hydrogen containing gas as purge fluid into the fuel cell to remove water from the fuel cell in response to the electric current detection signal.

12. A fuel cell system applied for a moving object, comprising:
    a fuel cell;
    first flow controlling means for controlling flow rate of oxygen containing gas to be supplied to the fuel cell;
    second flow controlling means for controlling flow rate of hydrogen containing gas to be supplied to the fuel cell; and
    purging means for purging water from the fuel cell in response to a decelerating condition of a moving object while activating the first flow control means and the second flow control means to increase supply of the oxygen containing gas and the hydrogen containing gas into the fuel cell as purge fluid to remove water from the fuel cell.

13. A method of controlling a fuel cell system for a moving object powered by the fuel cell, the fuel cell system having a first flow control valve controlling flow rate of oxygen containing gas to be supplied to the fuel cell and a second flow control valve controlling flow rate of hydrogen containing gas to be supplied to the fuel cell, the method comprising:
    obtaining a decelerating condition of a moving object; and
    increasing supply of the oxygen containing gas and the hydrogen containing gas into the fuel cell as purge fluid to purge water from the fuel cell in response to the decelerating condition of the moving object.

* * * * *